(No Model.)
C. D. SAWTELLE.
HARNESS REIN.
No. 600,652. Patented Mar. 15, 1898.
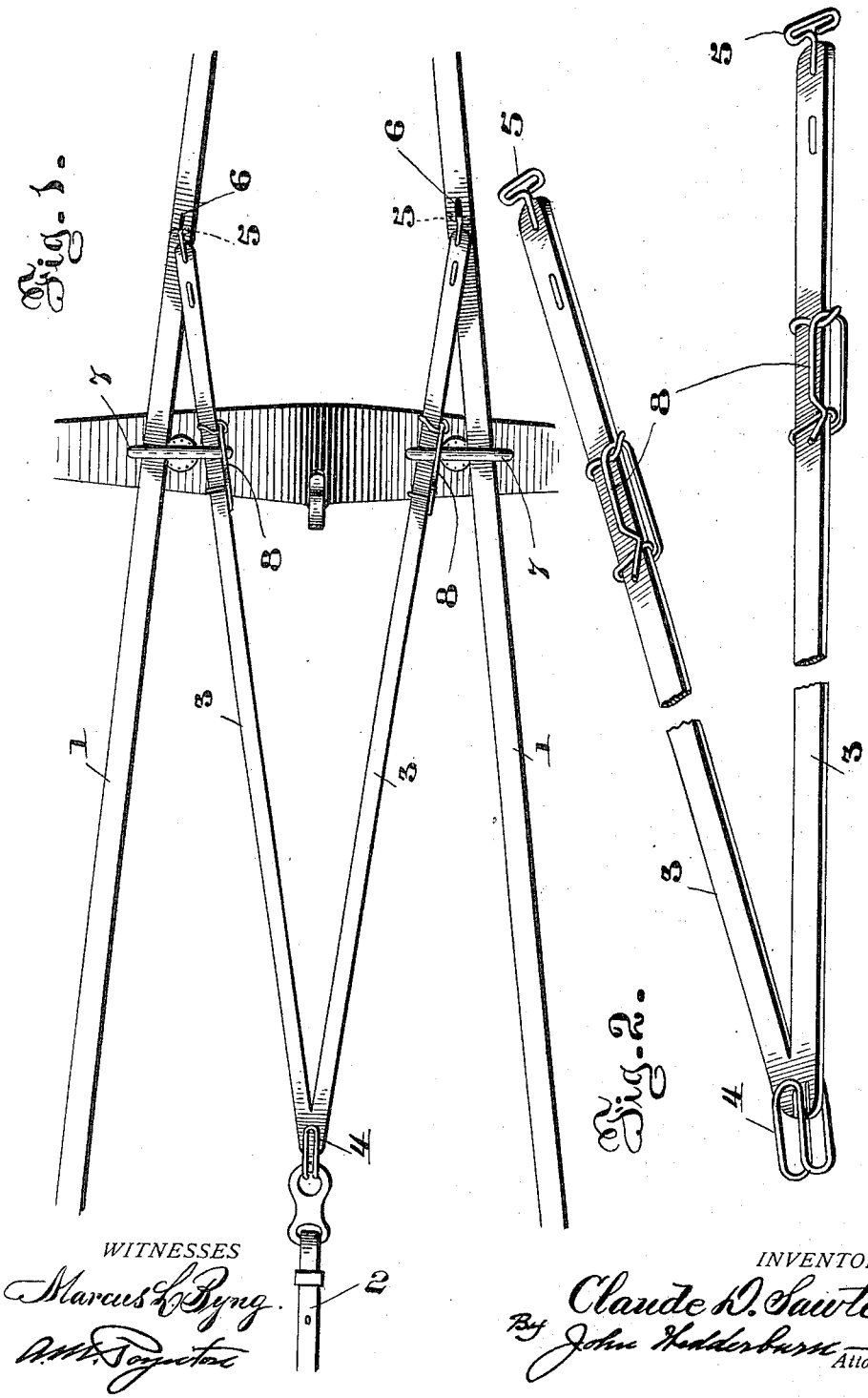

UNITED STATES PATENT OFFICE.

CLAUDE D. SAWTELLE, OF COALPORT, PENNSYLVANIA.

HARNESS-REIN.

SPECIFICATION forming part of Letters Patent No. 600,652, dated March 15, 1898.

Application filed January 20, 1897. Serial No. 619,909. (No model.)

*To all whom it may concern:*

Be it known that I, CLAUDE D. SAWTELLE, a citizen of the United States, residing at Coalport, in the county of Clearfield and State of Pennsylvania, have invented certain new and useful Improvements in Harness; and I do hereby declare the following to be a full, clear, and exact description of the invention, such as will enable others skilled in the art to which it appertains to make and use the same.

This invention has reference to a novel construction in harness, and relates more especially to the arrangement of the lines and check-rein.

The invention consists in the features of construction hereinafter fully described and claimed.

In the accompanying drawings, forming a part of this specification, Figure 1 is a top plan showing the manner in which the lines and check-rein are constructed and arranged in accordance with this invention. Fig. 2 is a perspective view of a portion of the check-rein in detail.

Referring now to said drawings, 1 indicates the lines, and 2 the bridle or check rein. The straps 3, forming the subject of this improvement, are joined together at their forward ends and provided with a hook 4, by means of which they are connected with the bridle-rein. The said straps are provided at their rear ends with heads 5 or other suitable devices for fastening them to the lines. In the construction illustrated these heads 5 are passed through slots or openings 6 in said lines. The straps 3 also pass through the terret-ring 7 of the harness, and as another and separate improvement the said straps are provided with hooks 8, by means of which they can be readily fastened to the terret-ring. As a convenient construction the said hooks are provided with a set of forwardly-extending spring-arms securely fastened to said straps near the rear ends of the same.

It will be seen that when the horse is driven by harness constructed in this manner the head can be checked or unchecked without the necessity of the driver alighting.

Among the advantages of this harness is that when the horse stumbles the result is that instead of breaking the rein or tearing the horse's mouth the horse pulls directly upon the lines and the driver is thus enabled to prevent him falling. In ascending a hill it is found that the horse walks faster if his head is free, and it can be accomplished with this device, and, furthermore, when the top of the hill is reached the horse can be reined up as desired. It is obvious that in driving over holes or into ditches or sudden descents that the horse can manage himself with a greater ease and certainty when he has an easy rein. It is seen, therefore, that the check or bridle rein is always under control of the lines, and that, furthermore, if it is desired to check the horse's head permanently the lines can be drawn back far enough to bring the ends of the hooks 8 in the rear of the terret-rings and then allowing the horse to draw the reins out to pull the hooks into engagement with the terret-ring. In this way the check-rein is in constant use, and the lines can be used in the usual manner owing to the harness and the ends of the straps 3. When the driver desires to unrein the horse, he draws back the lines until the hooks are free from the terret-rings. By slacking the lines the hooks fall to the bottom of the terret-rings and the horse draws them through freely. If desired, the horse can be driven reined, as described above, and unreined when necessary without getting out of the vehicle.

Having thus described my invention, what I claim as new, and desire to secure by Letters Patent, is—

The combination with the lines of harness, of two straps connected at their forward ends, a bridle-rein to the rear end of which the forward ends of the said straps are attached, fastening devices at the rear end of said straps for attachment to the lines, a harness-saddle having terret-rings thereon through which the lines and straps pass, and spring-hooks carried by the said straps and engaging the said terret-rings, substantially as described.

In testimony whereof I have signed this specification in the presence of two subscribing witnesses.

CLAUDE D. SAWTELLE.

Witnesses:
H. A. SWAN,
B. F. BYERS.